United States Patent
Gummadi et al.

(10) Patent No.: US 11,259,146 B2
(45) Date of Patent: Feb. 22, 2022

(54) SYSTEMS AND METHODS FOR EFFICIENT POSITIONING OF A MOBILE DEVICE WITH DUAL WIRELESS CONNECTIVITY

(71) Applicant: QUALCOMM Incorporated, San Diego, CA (US)

(72) Inventors: Bapineedu Chowdary Gummadi, Hyderabad (IN); Stephen William Edge, Escondido, CA (US); Hem Agnihotri, Benares (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/368,058

(22) Filed: Mar. 28, 2019

(65) Prior Publication Data
US 2020/0137522 A1 Apr. 30, 2020

(30) Foreign Application Priority Data
Oct. 30, 2018 (IN) .............................. 201841040965

(51) Int. Cl.
*H04W 4/029* (2018.01)
*H04W 64/00* (2009.01)
*H04W 88/06* (2009.01)

(52) U.S. Cl.
CPC ........... *H04W 4/029* (2018.02); *H04W 64/00* (2013.01); *H04W 88/06* (2013.01)

(58) Field of Classification Search
CPC ..... H04W 88/06; H04W 64/00; H04W 4/029; H04W 4/025
See application file for complete search history.

(56) References Cited

U.S. PATENT DOCUMENTS

| 2011/0090122 A1* | 4/2011 | Thomson | ........... G01S 5/02 342/450 |
| 2012/0184302 A1* | 7/2012 | Kazmi | ........... H04W 64/00 455/456.5 |

(Continued)

FOREIGN PATENT DOCUMENTS

WO WO-2019074435 A1 * 4/2019 ............ H04W 64/00

OTHER PUBLICATIONS

International Search Report and Written Opinion—PCT/US2019/053846—ISA/EPO—dated Mar. 31, 2020.
(Continued)

*Primary Examiner* — Margaret G Mastrodonato
(74) *Attorney, Agent, or Firm* — Thien T. Nguyen

(57) ABSTRACT

A user equipment (UE) has dual connectivity to a first Radio Access Technology (RAT) and a second RAT, such as Long Term Evolution (LTE) and New Radio (NR). The UE receives a request for location information for the first and second RATs, e.g., after transmitting capability information indicating dual connectivity. The UE obtains location information for the first and second RATs and transmits the location information to a location server. The location information, for example, may be location measurements obtained for the first and second RATs, a location estimate, or both. The request for location information may be received using the first RAT and the location information may be transmitted using the second RAT. The request for location information may include a first request for the first RAT, and a second request for the second RAT received after location information for the first RAT is obtained.

36 Claims, 8 Drawing Sheets

(56) References Cited

U.S. PATENT DOCUMENTS

| | | | | |
|---|---|---|---|---|
| 2012/0295623 A1* | 11/2012 | Siomina | ............... | G01S 5/0263 |
| | | | | 455/436 |
| 2013/0203447 A1* | 8/2013 | Hannan | ............... | H04W 64/00 |
| | | | | 455/456.5 |
| 2016/0050534 A1 | 2/2016 | Lim et al. | | |

OTHER PUBLICATIONS

LG Electronics Inc: "Support NR Positioning Under Dual Connectivity", 3GPP Draft; R2-1802923 Support NR Positioning Under Dual Connectivity, 3rd Generation Partnership Project (3GPP), Mobile Competence Centre; 650, Route Des Lucioles; F-06921 Sophia-Antipolis Cedex; vol. RAN WG2, No. Athens, Greece; Feb. 26, 2018-Mar. 2, 2018, Feb. 15, 2018 (Feb. 15, 2018), XP051399629, 2 pages, Retrieved from the Internet: URL: http://www.3gpp.org/ftp/tsg%5Fran/WG2%5FRL2/TSGR2%5F101/Docsj/ [retrieved on Feb. 15, 2018].

\* cited by examiner

SYSTEMS AND METHODS FOR EFFICIENT POSITIONING OF A MOBILE DEVICE WITH DUAL WIRELESS CONNECTIVITY

CLAIM OF PRIORITY UNDER 35 U.S.C. § 119

This application claims under 35 USC § 119 the benefit of and priority to India Provisional Application No. 201841040965, filed Oct. 30, 2018, and entitled "SYSTEMS AND METHODS FOR EFFICIENT POSITIONING OF A MOBILE DEVICE WITH DUAL WIRELESS CONNECTIVITY," which is assigned to the assignee hereof and is incorporated herein by reference in its entirety.

BACKGROUND

Field

Subject matter disclosed herein relates to estimation of a location of a mobile device and more particularly to locating a mobile device which has dual wireless connectivity, such as to LTE and 5G NR.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access, for example, a base station may transmit a positioning reference signal (PRS). A mobile device acquiring PRSs transmitted by different base stations may deliver signal-based measurements to a location server, which may be part of an Evolved Packet Core (EPC), for use in computing a location estimate of the mobile device using observed time difference of arrival (OTDOA) techniques. Alternatively, a mobile device may compute an estimate of its location using OTDOA techniques. In a cellular network implementing radio access using 5G New Radio (NR), PRS and OTDOA may be available similar to a 4G network. A mobile device with dual connectivity to both 4G (LTE) and 5G (NR) may need to be located. However, it may then not be clear how to make best use of 4G versus 5G location capabilities such as PRS and OTDOA. Methods to optimize location support for such cases may thus be desirable.

SUMMARY

A user equipment (UE) has dual connectivity to a first Radio Access Technology (RAT) and a second RAT, such as Long Term Evolution (LTE) and New Radio (NR). The UE receives a request for location information for the first and second RATs, e.g., after transmitting capability information indicating dual connectivity. The UE obtains location information for the first and second RATs and transmits the location information to a location server. The location information, for example, may be location measurements obtained for the first and second RATs, a location estimate determined using location measurements obtained for the first and second RATs, or both. The request for location information may be received using the first RAT and the location information may be transmitted using the second RAT. The request for location information may include a first request for the first RAT, and a second request for the second RAT received after location information for the first RAT is obtained.

In one implementation, a method of obtaining location information performed by a user equipment (UE) includes receiving from a location server a request for location information for a first and second Radio Access Technology (RAT), wherein the UE has dual connectivity to the first and second RATs; obtaining at least some of the location information for the first and second RATs; and transmitting the at least some of the location information to the location server.

In one implementation, a user equipment (UE) capable of obtaining location information, includes at least one wireless transceiver configured to wirelessly communicate with at least one wireless network; at least one memory; and at least one processor coupled to the at least one wireless transceiver and the at least one memory and configured to: receive from a location server a request for location information for a first and second Radio Access Technology (RAT), wherein the UE has dual connectivity to the first and second RATs; obtain at least some of the location information for the first and second RATs; and transmit the at least some of the location information to the location server.

In one implementation, a method of obtaining location information for a user equipment (UE) performed by a location server includes sending to the UE a request for location information for a first and second Radio Access Technologies (RATs), wherein the UE has dual connectivity to the first and second RATs; receiving from the UE at least some of the location information for the first and second RATs obtained by the UE; and obtaining a location estimate for the UE based on the at least some of the location information for the first and second RATs.

In one implementation, a location server for obtaining a location of a user equipment (UE) includes an external interface configured to communicate with a wireless network; at least one memory; and at least one processor coupled to the external interface and the at least one memory and configured to send to the UE a request for location information for a first and second Radio Access Technology (RAT), wherein the UE has dual connectivity to the first and second RATs; and receive from the UE at least some of the location information for the first and second RATs obtained by the UE.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1A:
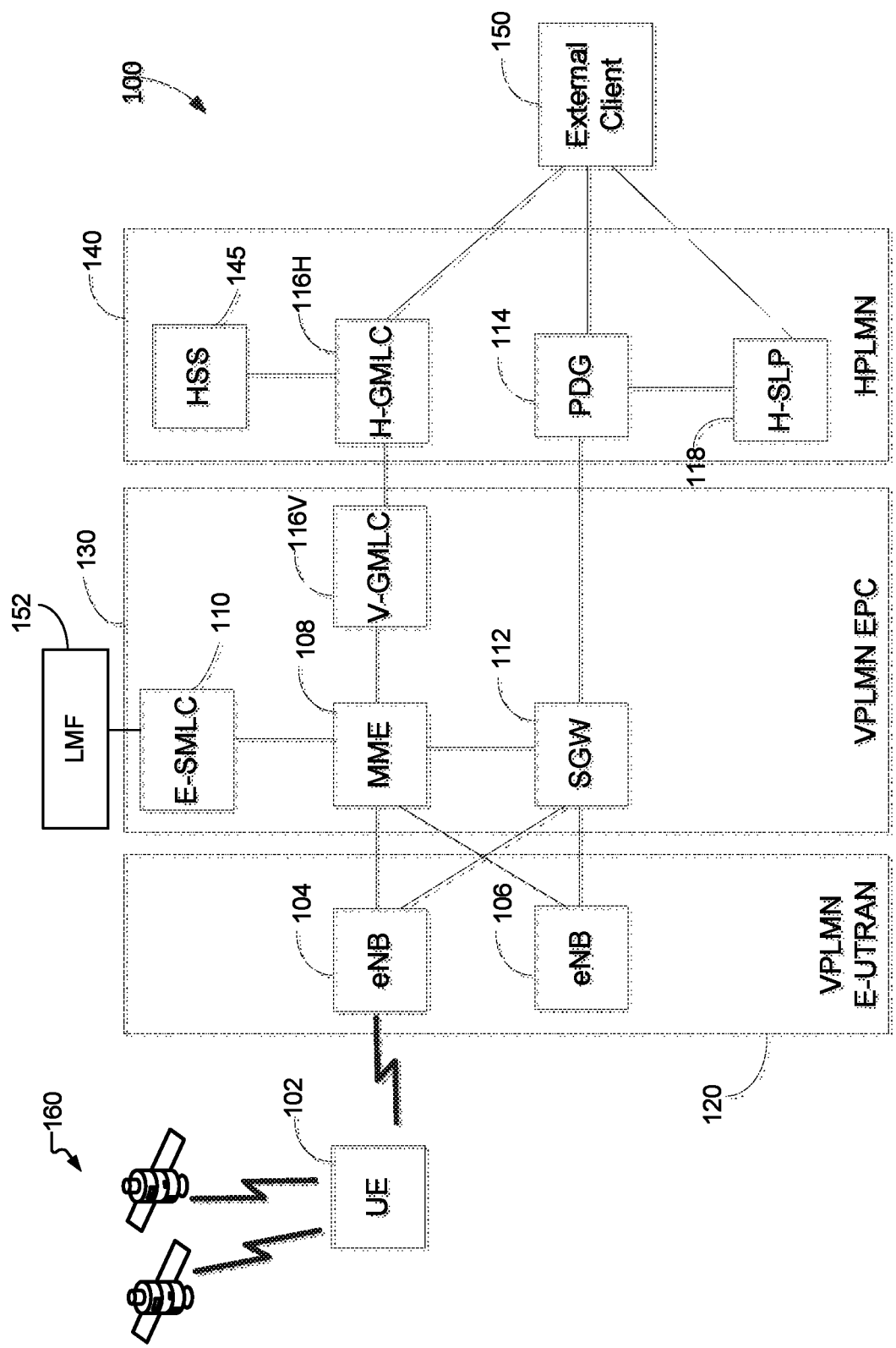
FIG. 1A is a system diagram illustrating certain features of a communication system comprising a UE and an Evolved Universal Mobile Telecommunications Service (UMTS) Terrestrial Radio Access (E-UTRA) network.

Reference is made in the following detailed description to accompanying drawings, which form a part hereof, wherein like numeric and alphanumeric labels may designate like parts throughout that are identical, similar and/or analogous. In addition, multiple instances of an element may be indicated by following a first number for the element with a hyphen and a second number. For example, multiple instances of an element 111 may be indicated as 111-1, 111-2, 111-3 etc. When referring to such an element using only the first number, any instance of the element is to be understood (e.g. element 111 in the previous example would refer any of the elements 111-1, 111-2 and 111-3).

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

To support positioning of a mobile device, two broad classes of location solution have been defined: control plane and user plane. With control plane (CP) location, signaling related to positioning and support of positioning may be carried over existing network (and mobile device) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for mobile devices that use radio access according to Global System for Mobile communications GSM (2G), Universal Mobile Telecommunications System (UMTS) (3G) and LTE (4G). A control plane location solution for Fifth Generation (5G) wireless access has been defined for regulatory services (e.g. emergency calls) and is being extended to support commercial location. The solutions for 2G, 3G and 4G are defined in 3GPP Technical Specifications (TSs) 23.271 (common part), 43.059 (GSM access), 25.305 (UMTS access) and 36.305 (LTE access). The solution for 5G is defined in 3GPP TSs 23.501, 23.502 and 38.305, and is being defined in 3GPP TS 23.273. The Open Mobile Alliance (OMA) has similarly defined a user plane (UP) location solution known as Secure User Plane Location (SUPL) which can be used to locate a mobile device accessing any of a number of radio interfaces that support IP packet access such as General Packet Radio Service (GPRS) with GSM, GPRS with UMTS, or IP access with LTE or 5G NR.

Both CP and UP location solutions may employ a location server (LS) to support positioning. The LS may be part of or accessible from a serving network or a home network for a user equipment (UE) or may simply be accessible over the Internet or over a local Intranet. If positioning of a UE is needed, an LS may instigate a session (e.g. a location session or a SUPL session) with the UE and coordinate location measurements by the UE and determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from a UE, e.g. for the Assisted Global Navigation Satellite System (A-GNSS), OTDOA and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using OTDOA).

In an alternative UE assisted mode of operation, a UE may return location measurements to an LS which may determine an estimated location of the UE based on these measurements and possibly based also on other known or configured data (e.g. satellite ephemeris data for GNSS location or base station characteristics including base station locations and possibly PRS timing in the case of terrestrial positioning using OTDOA).

In another standalone mode of operation, a UE may make location related measurements without any positioning assistance data from an LS and may further compute a location or a change in location without any positioning assistance data from an LS. Position methods that may be used in a standalone mode include GPS and GNSS (e.g. if a UE obtains satellite orbital data from data broadcast by GPS and GNSS satellites themselves) as well as sensors. It is noted that the terms "positioning assistance data", "location assistance data" and "assistance data" (AD) are used synonymously herein to refer to data which may be provided to a mobile device via broadcast or by point to point means to assist the mobile device to obtain location measurements (also referred to as positioning measurements) and/or to compute a location estimate from positioning measurements.

In the case of 3GPP CP location, an LS may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, an LS and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE access, in which case LPP or LPP/LPPe messages are exchanged between a UE and E-SMLC. LPP or LPPe messages may be exchanged between a UE and E-SMLC via a serving Mobility Management Entity (MME) and a serving eNodeB for the UE. LPP and LPP/LPPe may also be used to help support the OMA SUPL solution for many types of wireless access that support IP messaging (such as LTE and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message An LS and a base station (e.g. an eNodeB for LTE access) may exchange messages to enable the LS to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol defined in 3GPP TS 36.455 may be used to transfer such messages between a base station that is an eNodeB and an LS that is an E-SMLC.

Release 15 has introduced Evolved Universal Mobile Telecommunications Service (UMTS) Terrestrial Radio Access (E-UTRA) and New Radio (NR) Dual connectivity (EN-DC) where a UE is connected simultaneously to E-UTRA (LTE) via an evolved Node B (eNB) and to 5G NR via a New Radio (NR) NodeB (referred to as a gNB). In this case, the UE may be registered with a 5G core network (5GCN) via NR and simultaneously attached to an evolved packet core (EPC) via an eNB and able to send and receive voice and/or data via one or both networks. In EN-DC, the eNB for EUTRA (LTE) may have a master status with the gNB for NR having a secondary status. However, the master and secondary status roles can be reversed. Dual connectivity can also apply to other pairs of radio access technologies (RATs) such as WLAN (IEEE 802.11 WiFi and 5G NR).

FIG. 1A is a diagram illustrating a communication system 100 for location support of a UE 102 that supports and is currently using Long Term Evolution (LTE) radio access (also referred to as wideband LTE) or Narrow Band Internet of Things (NB-IoT) radio access (also referred to as narrowband LTE), where NB-IoT and LTE may be as defined by 3GPP—e.g. in 3GPP TS 36.300. The communication system 100 may be referred to as an Evolved Packet System (EPS). As illustrated, the communication system 100 may include the UE 102, an Evolved Universal Mobile Telecommunications Service (UMTS) Terrestrial Radio Access (E-UTRA) Network (E-UTRAN) 120, and an Evolved Packet Core (EPC) 130. The E-UTRAN 120 and the EPC 130 may be part of a Visited Public Land Mobile Network (VPLMN) that is a serving network for the UE 102 and communicates with a Home Public Land Mobile Network (HPLMN) 140 for the UE 102. FIG. 1A illustrates communication system 100 configured for roaming support of UE location. If desired, communication system 100 may be configured for non-roaming support of UE location by combining elements in the VPLMN 130 with the HPLMN 140. The VPLMN E-UTRAN 120, VPLMN EPC 130 and/or HPLMN 140 may interconnect with other networks. For example, the Internet may be used to carry messages to and from different networks such as the HPLMN 140 and the VPLMN EPC 130. For simplicity these networks and associated entities and interfaces are not shown. As shown, the communication system 100 provides packet-switched services to the UE 102. However, as those skilled in the art will readily appreciate, the various concepts presented throughout this disclosure may be extended to networks providing circuit-switched services.

The UE 102 may comprise any electronic device configured for NB-IoT and/or LTE radio access, for example. The UE 102 may be referred to as a device, a wireless device, a mobile terminal, a terminal, a mobile station (MS), a mobile device, a SET, or by some other name and may correspond to (or be part of) a smart watch, digital glasses, fitness monitor, smart car, smart appliance, cellphone, smartphone, laptop, tablet, PDA, tracking device, control device, or some other portable or moveable device. A UE 102 may comprise a single entity or may comprise multiple entities such as in a personal area network where a user may employ audio, video and/or data I/O devices and/or body sensors and a separate wireline or wireless modem. Typically, though not necessarily, a UE 102 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrow Band Internet of Things (NB-IoT), Enhanced Machine Type Communications (eMTC) also referred to as LTE category M1 (LTE-M), High Rate Packet Data (HRPD), 5G, WiMax, etc. VPLMN EPC 130 combined with VPLMN E-UTRAN 120, and HPLMN 140, may be examples of a WWAN. A UE 102 may also support wireless communication with one or more types of Wireless Local Area Network (WLAN) such as a WLAN supporting IEEE 802.11 WiFi or Bluetooth® (BT). UE 102 may also support communication with one or more types of wireline network such as by using a Digital Subscriber Line (DSL) or packet cable for example. Although FIG. 1A shows only one UE 102, there may be many other UEs that can each correspond to UE 102.

The UE 102 may enter a connected state with a wireless communication network that may include the E-UTRAN 120. In one example, UE 102 may communicate with a cellular communication network by transmitting wireless signals to, and/or receiving wireless signals from, a cellular transceiver, such as an evolved Node B (eNodeB or eNB) 104 in the E-UTRAN 120. The E-UTRAN 120 may include one or more additional eNBs 106. The eNB 104 provides user plane and control plane protocol terminations toward the UE 102. The eNB 104 may comprise a serving eNB for UE 102 and may also be referred to as a base station, a base transceiver station, a radio base station, a radio transceiver, a radio network controller, a transceiver function, a base station subsystem (BSS), an extended service set (ESS), or by some other suitable terminology. The UE 102 also may transmit wireless signals to, or receive wireless signals from, a local transceiver (not shown in FIG. 1A), such as an access point (AP), femtocell, Home Base Station, small cell base station, Home Node B (HNB) or Home eNodeB (HeNB), which may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course, it should be understood that these are merely examples of networks that may communicate with a mobile device over a wireless link, and claimed subject matter is not limited in this respect.

Examples of network technologies that may support wireless communication include NB-IoT and LTE, but may further include GSM, CDMA, WCDMA, HRPD, eMTC and Fifth Generation (5G) radio types. NB-IoT, GSM, WCDMA, LTE, eMTC and 5G NR are technologies defined by 3GPP. CDMA and HRPD are technologies defined by the 3rd Generation Partnership Project 2 (3GPP2). Cellular transceivers, such as eNBs 104 and 106, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 104 and 106 may be connected by an interface (e.g. the 3GPP S1 interface) to the VPLMN EPC 130. The EPC 130 includes a Mobility Management Entity (MME) 108, and a Serving Gateway (SGW) 112 through which data (e.g. Internet Protocol (IP) packets) to and from the UE 102 may be transferred. The MME 108 may be the serving MME for UE 102 and is then the control node that processes the signaling between the UE 102 and the EPC 130 and supports attachment and network connection of UE 102, mobility of UE 102 (e.g. via handover between network cells) as well as establishing and releasing data bearers on behalf of the UE 102. Generally, the MME 108 provides bearer and connection management for the UE 102 and may be connected to the SGW 112, the eNBs 104 and 106, an Enhanced Serving Mobile Location Center (E-SMLC) 110 and a Visited Gateway Mobile Location Center (V-GMLC) 116V in the VPLMN EPC 130.

The E-SMLC 110 may support location of the UE 102 using the 3GPP control plane (CP) location solution defined in 3GPP technical specifications (TSs) 23.271 and 36.305. The V-GMLC 116V, which may also be referred to simply as a Gateway Mobile Location Center (GMLC) 116V, may provide access on behalf of an external client (e.g. external client 150) or another network (e.g. HPLMN 140) to the location of UE 102. The external client 150 may comprise a web server or remote application that may have some association with UE 102 (e.g. may be accessed by a user of UE 102 via VPLMN E-UTRAN 120, VPLMN EPC 130 and HPLMN 140) or may be a server, application or computer system providing a location service to some other user or users which may include obtaining and providing the location of UE 102 (e.g. to enable a service such as friend or relative finder, asset tracking or child or pet location). As illustrated, the E-SMLC 110 may be connected to an external Location Management Function (LMF) 152, which may be part of a Fifth Generation (5G) network, illustrated in FIG. 1B.

As illustrated, the HPLMN 140 includes a Home Gateway Mobile Location Center (H-GMLC) 116H that may be connected to the V-GMLC 116V (e.g. via the Internet), as well as a Packet Data Network Gateway (PDG) 114 that may be connected to the SGW 112 (e.g. via the Internet). The PDG 114 may provide UE 102 with Internet Protocol (IP) address allocation and IP and other data access to external networks (e.g. the Internet) and to external clients (e.g. external client 150) and external servers, as well as other data transfer related functions. In some cases, PDG 114 may be located in VPLMN EPC 130 and not in HPLMN 140 when the UE 102 receives local IP breakout. The PDG 114 may be connected to a location server, such as H-SLP 118. The H-SLP 118 may support the SUPL UP location solution defined by OMA and may support location services for UE 102 based on subscription information for UE 102 stored in H-SLP 118. In some embodiments of communication system 100, a Discovered SLP (D-SLP) or Emergency SLP (E-SLP) (not shown in FIG. 1A), in or accessible from VPLMN EPC 130, may be used to locate UE 102 using the SUPL UP solution.

The H-GMLC 116H may be connected to a Home Subscriber Server (HSS) 145 for UE 102, which is a central database that contains user-related and subscription-related information for UE 102. The H-GMLC 116H may provide location access to the UE 102 on behalf of external clients such as external client 150. One or more of the H-GMLC 116H, PDG 114, and H-SLP 118 may be connected to the external client 150, e.g., through another network, such as the Internet. In some cases, a Requesting GMLC (R-GMLC) located in another PLMN (not shown in FIG. 1A) may be connected to H-GMLC 116H (e.g. via the Internet) in order to provide location access to UE 102 on behalf of external clients connected to the R-GMLC. The R-GMLC, H-GMLC 116H and V-GMLC 116V may support location access to the UE 102 using the 3GPP CP solution defined in 3GPP TS 23.271.

It should be understood that while a VPLMN network (comprising VPLMN E-UTRAN 120 and VPLMN EPC 130) and a separate HPLMN 140 are illustrated in FIG. 1A; both PLMNs (networks) may be the same PLMN. In that case, (i) the H-SLP 118, PDG 114, and HSS 145, may be in the same network (EPC) as the MME 108, and (ii) the V-GMLC 116V and the H-GMLC 116H may comprise the same GMLC.

In particular implementations, the UE 102 may have circuitry and processing resources capable of obtaining location related measurements (also referred to as location measurements), such as measurements for signals received from GPS or other Satellite Positioning System (SPS) Satellite Vehicles (SVs) 160, measurements for cellular transceivers such as eNBs 104 and 106, and/or measurements for local transceivers. UE 102 may further have circuitry and processing resources capable of computing a position fix or estimated location of UE 102 based on these location related measurements. In some implementations, location related measurements obtained by UE 102 may be transferred to a location server, such as the E-SMLC 110, H-SLP 118 or LMF 152 (described later for FIG. 1B), after which the location server may estimate or determine a location for UE 102 based on the measurements.

In particular implementations, the UE 102 may have circuitry and processing resources capable of obtaining location related measurements. Location related measurements obtained by UE 102 may include measurements of signals received from SVs 160 that are part of an SPS or Global Navigation Satellite System (GNSS) such as GPS, GLONASS, Galileo or Beidou and/or may include measurements of signals received from terrestrial transmitters fixed at known locations (e.g., such as eNB 104, eNB 106 or other local transceivers, such as gNBs 111 discussed below). UE 102 or a separate location server (e.g. E-SMLC 110, H-SLP 118 or LMF 152) may then obtain a location estimate for the UE 102 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), WiFi, or combinations thereof. In some of these techniques (e.g. A-GNSS, AFLT and OTDOA), pseudoranges or timing differences may be measured by UE 102 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 102. Here, location servers, such as E-SMLC 110, H-SLP 118 or LMF 152, may be capable of providing positioning assistance data to UE 102 including, for example, information regarding signals to be measured by UE 102 (e.g., expected signal timing, signal coding, signal frequencies, signal Doppler), locations and/or identities of terrestrial transmitters, and/or signal, timing and orbital information for GNSS SVs to facilitate positioning techniques such as A-GNSS, AFLT, OTDOA and ECID. The facilitation may include improving signal acquisition and measurement accuracy by UE 102 and/or, in some cases, enabling UE 102 to compute its estimated location based on the location measurements.

For example, a location server may comprise an almanac (e.g., a Base Station Almanac (BSA)) which indicates the locations and identities of cellular transceivers and transmitters (e.g. eNBs 104 and 106 or gNBs 111) and/or local transceivers and transmitters in a particular region or regions such as a particular venue, and may further contain information descriptive of signals transmitted by these transceivers and transmitters such as signal power, signal timing, signal bandwidth, signal coding and/or signal frequency. In the case of ECID, a UE 102 may obtain measurements of signal strength (e.g. received signal strength indication (RSSI) or reference signal received power (RSRP)) for signals received from cellular transceivers (e.g., eNBs 104, 106 or gNBs 111) and/or local transceivers and/or may obtain a signal to noise ratio (S/N), a reference signal received quality (RSRQ), or a round trip signal propagation time (RTT) between UE 102 and a cellular transceiver (e.g., eNB 104 or 106 or a gNB 111) or a local transceiver. A UE 102 may transfer these measurements to a location server, such as E-SMLC 110, H-SLP 118 or LMF 152, to determine a location for UE 102, or in some implementations, UE 102 may use these measurements together with positioning assistance data (e.g. terrestrial almanac data or GNSS SV data such as GNSS Almanac and/or GNSS Ephemeris information) received from the location server to determine a location for UE 102.

In the case of OTDOA, UE 102 may measure a Reference Signal Time Difference (RSTD) between signals, such as a Position Reference Signal (PRS) or Cell Specific Reference Signal (CRS), received from nearby transceivers or base stations (e.g. eNBs 104 and 106 or gNBs 111). An RSTD measurement may provide the time of arrival difference between signals (e.g. CRS or PRS) received at UE 102 from two different transceivers (e.g. an RSTD between signals received from eNB 104 and from eNB 106 or from two gNBs 111). The UE 102 may return the measured RSTDs to a location server (e.g. E-SMLC 110, H-SLP 118 or LMF 152) which may compute an estimated location for UE 102 based on known locations and known signal timing for the measured transceivers. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

An estimate of a location of a UE 102 may be referred to as a location, location estimate, location fix, fix, position, position estimate or position fix, and may be geodetic, thereby providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of a UE 102 may also include an uncertainty and may then be expressed as an area or volume (defined either geodetically or in civic form) within which the UE 102 is expected to be located with some given or default probability or confidence level (e.g., 67% or 95%). A location of a UE 102 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g. obtained by UE 102 or by another entity such as eNB 104) that are used to determine (e.g. calculate) a location estimate for UE 102 may be referred to as measurements, location measurements, location related measurements, positioning measurements or position measurements and the act of determining a location for the UE 102 may be referred to as positioning of the UE 102 or locating the UE 102.

Figure 1B:
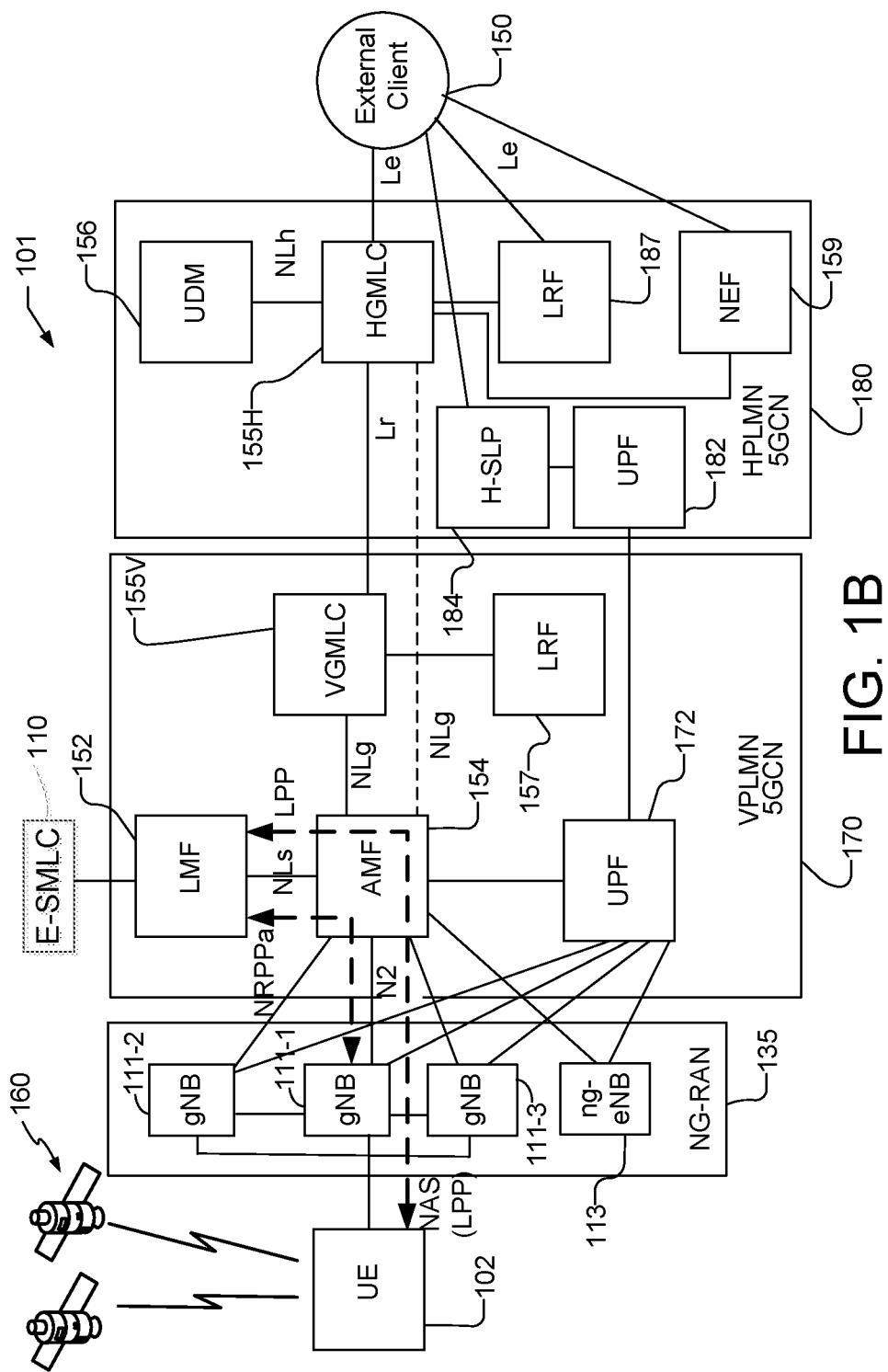
FIG. 1B is a system diagram illustrating certain features of a communication system comprising a UE and New Radio (NR) network.

FIG. 1B is a diagram illustrating a communication system 101 for location support of a UE 102 that supports and is currently using a Fifth Generation (5G) network comprising a Next Generation Radio Access Network (NG-RAN) 135, which includes base stations (BSs) sometimes referred to as New Radio (NR) NodeBs or gNBs 111-1, 111-2 and 111-3 (collectively and generically referred to herein as gNBs 111), a visited 5G Core Network (5GCN) 170 that is in communication with the UE 102 via the NG-RAN 135, which is a visited network, i.e., Visited Public Land Mobile Network (VPLMN), and a home network 5GCN, i.e., Home Public Land Mobile Network (HPLMN) 180 that is in communication with the VPLMN 170 and an external client 150. FIG. 1B illustrates communication system 101 configured for roaming support of UE location. If desired, communication system 101 may be configured for non-roaming support of UE location by combining elements in the VPLMN 170 with the HPLMN 180.

A 5G network may also be referred to as a New Radio (NR) network; NG-RAN 135 may be referred to as an NR RAN or a 5G RAN; and 5GCN 170 and 180 may be referred to as a Next Generation (NG) Core network (NGC). The communication system 101 may further utilize information from satellite vehicles (SVs) 160 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 101 are described below. The communication system 101 may include additional or alternative components.

It should be noted that FIG. 1B provides only a generalized illustration of various components, any or all of which may be utilized as appropriate, and each of which may be duplicated or omitted as necessary. Specifically, although only one UE 102 is illustrated, it will be understood that many UEs (e.g., hundreds, thousands, millions, etc.) may utilize the communication system 101. Similarly, the communication system 101 may include a larger or smaller number of SVs 160, gNBs 111, external clients 150, and/or other components. The illustrated connections that connect the various components in the communication system 101 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1B illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 102 may communicate with an Access Network (AN), as opposed to an NG-RAN, and accordingly, component 135 is sometimes referred to herein as an AN or as a RAN, denoted by the term "(R)AN" or "(R)AN 135". In the case of an AN, such as an IEEE 802.11 WiFi (also referred to as Wi-Fi) AN, the AN may be connected to a Non-3GPP Interworking Function (N3IWF) (not shown in FIG. 1B), e.g. via the Internet, with the N3IWF connected to AMF 154.

The UE 102 may enter a connected state with a wireless communication network that may include the NG-RAN 135. In one example, the UE 102 may communicate with a cellular communication network by transmitting wireless signals to, or receiving wireless signals from a cellular transceiver, in the NG-RAN 135, such as a gNB 111. A transceiver provides user plane and control plane protocol terminations toward the UE 102 and may be referred to as a base station, a base transceiver station, a radio base station, a radio transceiver, a radio network controller, a transceiver function, a base station subsystem (BSS), an extended service set (ESS), or by some other suitable terminology.

As shown in FIG. 1B, pairs of gNBs 111 in NG-RAN 135 may be connected to one another, e.g., directly as shown in FIG. 1B or indirectly via other gNBs 111. Access to the 5G network is provided to UE 102 via wireless communication between the UE 102 and one or more of the gNBs 111, which may provide wireless communication access to the 5GCN 170 and 180 on behalf of the UE 102 using 5G (e.g. NR). In FIG. 1B, the serving gNB for UE 102 is assumed to be gNB 111-1, although other gNBs (e.g. gNB 111-2 and/or gNB 111-3) may act as a serving gNB if UE 102 moves to another location or may act as a secondary gNB to provide additional throughout and bandwidth to UE 102. Some gNBs 111 in FIG. 1B (e.g. gNB 111-2 or gNB 111-3) may be configured to function as positioning-only beacons which may transmit signals (e.g. directional PRS) to assist positioning of UE 102 but may not receive signals from UE 102 or from other UEs.

As noted, while FIG. 1B depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GCN 170 and 180. Thus, the NG-RAN 135 may include any combination of gNBs, eNBs, or other types of base stations or access points. As an example, NG-RAN 135 may include one or more next generation eNBs (ng-eNBs) 113, which provide LTE wireless access to UE 102 and may connect to entities in 5GCN 170 and 180 such as AMF 154. The gNBs 111 and/or the ng-eNB 113 can communicate with the Access and Mobility Management Function (AMF) 154, which, for positioning functionality, communicates with a Location Management Function (LMF) 152 in the VPLMN 170. The AMF 154 may support mobility of the UE 102, including cell change and handover and may participate in supporting a signaling connection to the UE 102 and possibly helping establish and release Protocol Data Unit (PDU) sessions for UE 102. Other functions of AMF 154 may include: termination of a control plane (CP) interface from NG-RAN 135; termination of Non-Access Stratum (NAS) signaling connections from UEs such as UE 102, NAS ciphering and integrity protection; registration management; connection management; reachability management; mobility management; access authentication and authorization.

The LMF 152 may support positioning of the UE 102 when UE 102 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), WLAN positioning, and/or other position methods. The LMF 152 may also process location services requests for the UE 102, e.g., received from a Visited Gateway Mobile Location Center (VGMLC) 155V. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 102's location) may be performed at the UE 102 (e.g., using signal measurements for signals transmitted by wireless nodes, and assistance data provided to the UE 102). As illustrated, the LMF 152 may be connected to the E-SMLC 110, which may be part of E-UTRAN network, illustrated in FIG. 1A.

The VGMLC 155V may support a location request for the UE 102 received from an external client 150, via an HGMLC 155H in the HPLMN 180 and may forward such a location request to a serving AMF 154 for UE 102. The AMF 154 may then forward the location request to LMF 152 which may obtain one or more location estimates for UE 102 (e.g. according to the request from external client 150) and may return the location estimate(s) to AMF 154, which may return the location estimate(s) to external client 150 via VGMLC 155V and HGMLC 155H.

HGMLC 155H may contain subscription information for an external client 150 and may authenticate and authorize a location request for UE 102 from external client 150. VGMLC 155V or HGMLC 155H may further initiate a location session for UE 102 by sending a location request for UE 102 to AMF 154, and may include in the location request an identity for UE 102 and the type of location being requested (e.g. such as a current location or a sequence of periodic or triggered locations).

As further illustrated in FIG. 1B, the LMF 152 and the gNBs 111 may communicate using a New Radio Positioning Protocol A (NRPPa). NRPPa may be defined in 3GPP TS 38.455 and may be the same as, similar to, or an extension of the LTE Positioning Protocol A (LPPa) defined in 3GPP TS 36.455, with NRPPa messages being transferred between the gNBs 111 and the LMF 152 via the AMF 154. As further illustrated in FIG. 1B, LMF 152 and UE 102 may communicate using the LTE Positioning Protocol (LPP) defined in 3GPP TS 36.355, where LPP messages are transferred between the UE 102 and the LMF 152 via the serving AMF 154 and a serving gNB 111-1 for UE 102. For example, LPP messages may be transferred between the LMF 152 and the AMF 154 using a service based interface based on the HyperText Transfer Protocol (HTTP), and may be transferred between the AMF 154 and the UE 102 using a Non-Access Stratum (NAS) protocol. The LPP protocol may be used to support positioning of UE 102 using UE assisted and/or UE based position methods such as Assisted GNSS (A-GNSS), Real Time Kinematics (RTK), Wireless Local Area Network (WLAN), Observed Time Difference of Arrival (OTDOA) and/or Enhanced Cell Identity (ECID). The NRPPa protocol may be used to support positioning of UE 102 using network based position methods such as ECID (when used with measurements obtained by a gNB 111) and/or may be used by LMF 152 to obtain location related information from gNBs 111 such as parameters defining positioning reference signal (PRS) transmission from gNBs 111 for support of OTDOA.

With a UE assisted position method, UE 102 may obtain location measurements (e.g. measurements of RSSI, RTT, RSTD, RSRP and/or RSRQ for gNBs 111, ng-eNBs 113 or WLAN APs, or measurements of GNSS pseudorange, code phase and/or carrier phase for SVs 160) and send the measurements to a location server (e.g. LMF 152) for computation of a location estimate for UE 102. With a UE based position method, UE 102 may obtain location measurements (e.g. which may be the same as or similar to location measurements for a UE assisted position method) and may compute a location of UE 102 (e.g. with the help of assistance data received from a location server such as LMF 152 or broadcast by gNBs 111, ng-eNBs 113 or other base stations or APs). With a network based position method, one or more base stations (e.g. gNBs 111 and/or ng-eNBs 113) or APs may obtain location measurements (e.g. measurements of RSSI, RTT, RSRP, RSRQ or TOA for signals transmitted by UE 102) and/or may receive measurements obtained by UE 102, and may send the measurements to a location server (e.g. LMF 152) for computation of a location estimate for UE 102.

Information provided by the gNBs 111 to the LMF 152 using NRPPa may include timing and configuration information for PRS transmission and location coordinates of the gNBs 111. The LMF 152 can then provide some or all of this information to the UE 102 as assistance data in an LPP message via the NG-RAN 135 and the 5GCN 170.

An LPP message sent from the LMF 152 to the UE 102 may instruct the UE 102 to do any of a variety of things, depending on desired functionality. For example, the LPP message could contain an instruction for the UE 102 to obtain measurements for GNSS (or A-GNSS), WLAN, and/or OTDOA (or some other position method). In the case of OTDOA, the LPP message may instruct the UE 102 to obtain one or more measurements (e.g. RSTD measurements) of PRS signals transmitted within particular cells supported by particular gNBs 111 (or supported by one or more ng-eNBs 113 or eNBs). The UE 102 may send the measurements back to the LMF 152 in an LPP message (e.g. inside a NAS message) via the serving gNB 111-1 and the AMF 154.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

When NG-RAN 135 includes one or more ng-eNBs 113, an ng-eNB 113 may communicate with LMF 152 using NRPPa in order to support positioning of UE 102 (e.g. using a network based position method) and/or may enable transfer of LPP and/or NPP messages between UE 102 and LMF 152 via the ng-eNB 113 and AMF 154. An ng-eNB 113 and/or a gNB 111 in NG-RAN 135 may also broadcast positioning assistance data to UEs such as UE 102.

As illustrated, the VGMLC 155V may be connected to a Location Retrieval Function (LRF) 157, which handles retrieval of location information for the UE 102 and may be used to provide location information for UE 102 to an external client 150 that is a Public Safety Answering Point (PSAP), e.g. following an emergency call from UE 102 to the PSAP.

The HPLMN 180 may include a Unified Data Management (UDM) 156 connected to the HGMLC 155H. The UDM 156 is analogous to a Home Subscriber Server (HSS) for LTE access, and if desired, the UDM 156 may be combined with an HSS. The UDM 156 is a central database that contains user-related and subscription-related information for UE 102 and may perform the following functions: UE authentication, UE identification, access authorization, registration and mobility management, subscription management and Short Message Service management. Additionally, the HGMLC 155H may be connected to an LRF 187 in the HPLMN 180.

To support services including location services from external clients 150 for Internet of Things (IoT) UEs, a Network Exposure Function (NEF) 159 may be included in the HPLMN 180. An NEF may also be referred to as a Service Capability Exposure Function (SCEF), e.g. for a UE 102 with LTE access to an EPC rather than 5G NR radio access to 5GCN 170. The NEF 159, for example, may function to obtain a current or last known location for a UE 102, may obtain an indication of a change in location for a UE 102, or an indication of when a UE 102 becomes available (or reachable). The NEF 159 may be connected to the HGMLC 155H to support last known location, current location and/or deferred periodic and triggered location for the UE 102. If desired, the NEF 159 may include, replace, or may be combined with, the HGMLC 155H.

The VGMLC 155V and HGMLC 155H may be sometimes collectively and generically referred to herein as GMLC 155. The HGMLC 155H is in communication with the external client 150, as well as the UDM 156 and LRF 187 in the HPLMN 180. The LRF 187 may also communicate with the external client 150 and may perform similar functions to LRF 157. The HGMLC 155H may provide location access to UE 102 on behalf of external clients such as external client 150. One or more of HGMLC 155H and LRF 187 may be connected to external client 150, e.g., through another network, such as the Internet. In some cases, a Requesting GMLC (RGMLC) located in another PLMN (not shown in FIG. 1B) may be connected to HGMLC 155H (e.g., via the Internet) in order to provide location access to UE 102 on behalf of external clients connected to the RGMLC. The RGMLC, HGMLC 155H and VGMLC 155V may support location access to UE 102, at least in part, using the 3GPP CP solution defined in 3GPP TS 23.271 and/or 3GPP TS 23.273.

The VPLMN 170 may include a User Plane Function (UPF) 172 that is connected to the gNBs 111 and ng-eNB 113 in the NG-RAN 135. The UPF 172 may be further connected to the AMF 154 and to another UPF 182 in the HPLMN 5GCN 180. The UPF 182 in the HPLMN 5GCN 180 may be coupled to an H-SLP 184, which is connected to the external client 150.

To support dual connectivity for a UE 102, the V-PLMN E-UTRAN 120 and VPLMN EPC 130 in communication system 100 would typically belong to the same network operator as the NG-RAN 135 and VPLMN 5GCN 170 in communication system 101 and both would provide radio coverage (via LTE in communication system 100 and via NR in communication system 101) at the location of UE 102. This will enable UE 102 to obtain dual connectivity using both an LTE RAT (via VPLMN E-UTRAN 120) and an NR RAT (via NG-RAN 135), wherein UE 102 is registered with VPLMN 5GCN 170 and simultaneously attached to VPLMN EPC 130.

It is noted that in the description and accompanying referenced figures below, location of a UE 102 with dual connectivity is described generically and may be implemented by the communication system 100 of FIG. 1A and/or the communication system 101 of FIG. 1B. For example, the references below to a location server may apply to E-SMLC 110, LMF 152 or a combination of E-SMLC 110 and LMF 152, and references below to a base station may apply to eNB 104, 106, gNB 111, ng-eNB 113 or an IEEE 802.11 WiFi AP or AN. In some examples of the signaling flows described below for FIGS. 2 and 3, the UE 102 may have dual connectivity to an LTE RAT in communication system 100 (e.g. connectivity to eNB 104 in E-UTRAN 120) and an NR RAT in communication system 101 (e.g. connectivity to gNB 111-1 in NG-RAN 135). In some other examples of the signaling flows described below for FIGS. 2 and 3, the UE 102 may have dual connectivity to an NR RAT in communication system 101 (e.g. connectivity to gNB 111-1 in NG-RAN 135) and an IEEE 802.11 WiFi RAT supported by an AN or AP connected to an N3IWF, as described previously for communication system 101. In these other examples, UE 102 may be dual registered to 5GCN 170 via both the NR RAT and the IEEE 802.11 WiFi RAT.

Figure 2:
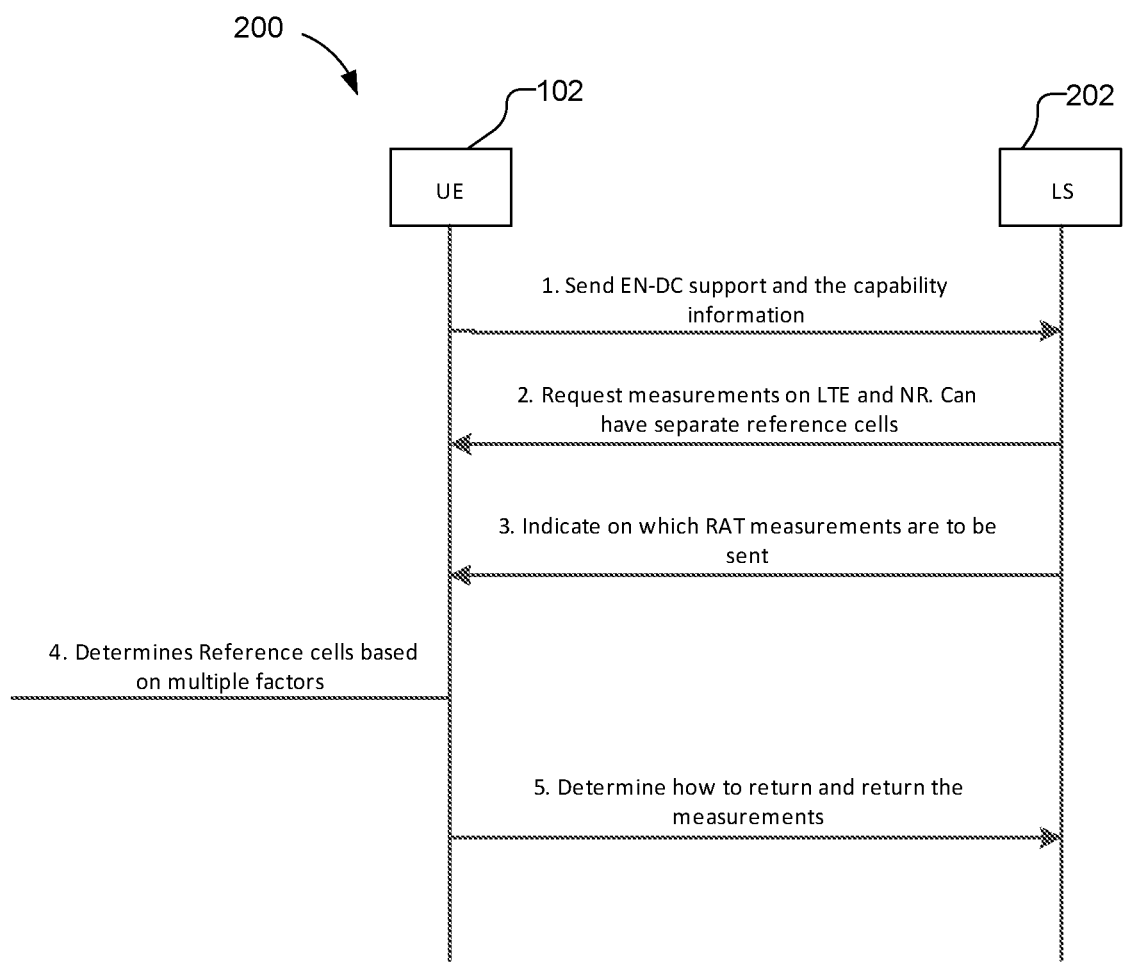
FIGS. 2 to 3 are signaling flow diagrams showing obtaining location information for a UE with dual connectivity according to various embodiments.

FIG. 2 shows an example signaling flow 200 applicable to a UE 102 that may have dual connectivity (DC) to both LTE access according to communication system 100 and NR access according to communication system 101. DC may enable more accurate and/or more reliable positioning of UE 102. Aspects that depend on the use of DC are highlighted in the discussion below.

At stage 1 in FIG. 2, the UE 102 may send its level of EN-DC support and positioning capabilities to location server (LS) 202, which may be, e.g., the E-SMLC 110 or LMF 152. For example, UE 102 may send an LPP Provide Capabilities message to LS 202 and may include the positioning capabilities of UE 102 and the capabilities of UE 102 to support EN-DC and/or may indicate whether UE 102 is currently using EN-DC (e.g. whether UE 102 is registered with 5GCN 170 via NG-RAN 135 and simultaneously attached to EPC 130 via E-UTRAN 120). The location server 202 will thus be aware of the multiple connections to UE 102 possible on the different RATs and it can provide assistance data to UE 102 via one or more different RAT's (LTE, NR etc.). The UE 102 may also send its EUTRAN-NR dual connectivity band combination support capabilities to the location server 202.

At stage 2, the location server 202 requests location measurements from UE 102 for NR and/or for LTE, based on the UE 102 positioning capabilities and EN-DC capabilities received at stage 1. For example, the location server may request location measurements (e.g. RSTD measurements) for OTDOA for LTE access (e.g. for eNBs 104 and 106 in E-UTRAN 120) and/or OTDOA for NR access (e.g. for gNBs 111 and/or ng-eNBs 113 in NG-RAN 135). When OTDOA measurements are requested for both LTE and NR access, the location server 202 can provide separate reference cells for each of NR and LTE to UE 102 or one common reference cell (which may be either an LTE cell or an NR cell). As an example, stage 2 may comprise the transmission of an LPP Request Location Information message from LS 202 to UE 102 via either LTE access (e.g. via EPC 130 and E-UTRAN 120) or NR access (e.g. via NG-RAN 135 and 5GCN 170). For example, LTE access may be used when LS 202 comprises E-SMLC 110 and NR access may be used when LS 202 comprises LMF 152. In some implementations, LS 202 may comprise a combination of E-SMLC 110 and LMF 152, which may enable LS 202 to select a preferred access type for sending of the location request at stage 2.

At stage 3, the location server 202 indicates to UE 102 whether the location measurements requested at stage 2 can be returned by UE 102 using a different RAT than the RAT used to send the request in stage 2 (e.g., via LTE if NR was used for signaling at stage 2 and vice versa) and provides suitable correlation information to enable use of the different RAT. For example, the correlation information may include a reference (e.g. a unique sequence of digits or characters) that is known to LS 202 and identifies UE 102 and/or identifies a location session between LS 202 and UE 102. Stages 2 and 3 may be combined in some implementations.

At stage 4, for OTDOA location measurements, the UE 102 determines or verifies a reference cell or cells with the option to change or remove a reference cell sent by the location server 202 at stage 2. Typically, for OTDOA, one reference cell is needed at a minimum, but a UE 102 could use two separate reference cells, e.g. one LTE reference cell for LTE measurements and another NR reference cell for NR measurements. UE 102 then obtains the location measurements (or at least some of the location measurements) requested at stage 2.

At stage 5, the UE 102 determines how to return the location measurements according to stage 3 and returns the location measurements to LS 202 using the same RAT as in stages 2 and 3 or using a different RAT (e.g. if requested at stage 3). As an example, stage 5 may comprise the transmission of an LPP Provide Location Information message from UE 102 to LS 202 via either LTE access (e.g. via EPC 130 and E-UTRAN 120) when UE 102 determines to use LTE, or via NR access (e.g. via NG-RAN 135 and 5GCN 170) when UE 102 determines to use NR.

As an option prior to stage 2, the location server 202 may request and subsequently receive less accurate measurements from UE 102 using one RAT only (not shown in FIG. 2) and then request and receive more accurate measurements from UE 102 as in stages 2-5. For example, the location server 202 may first request less accurate LTE measurements using stages similar to stages 2-5 and may then request more accurate NR measurements according to stages 2-5. The less accurate location measurements can be used by LS 202 to determine an approximate location for UE 102 which may then be used by LS 202 to determine suitable reference and neighbor cells for more accurate location measurements using OTDOA for NR.

Figure 3:
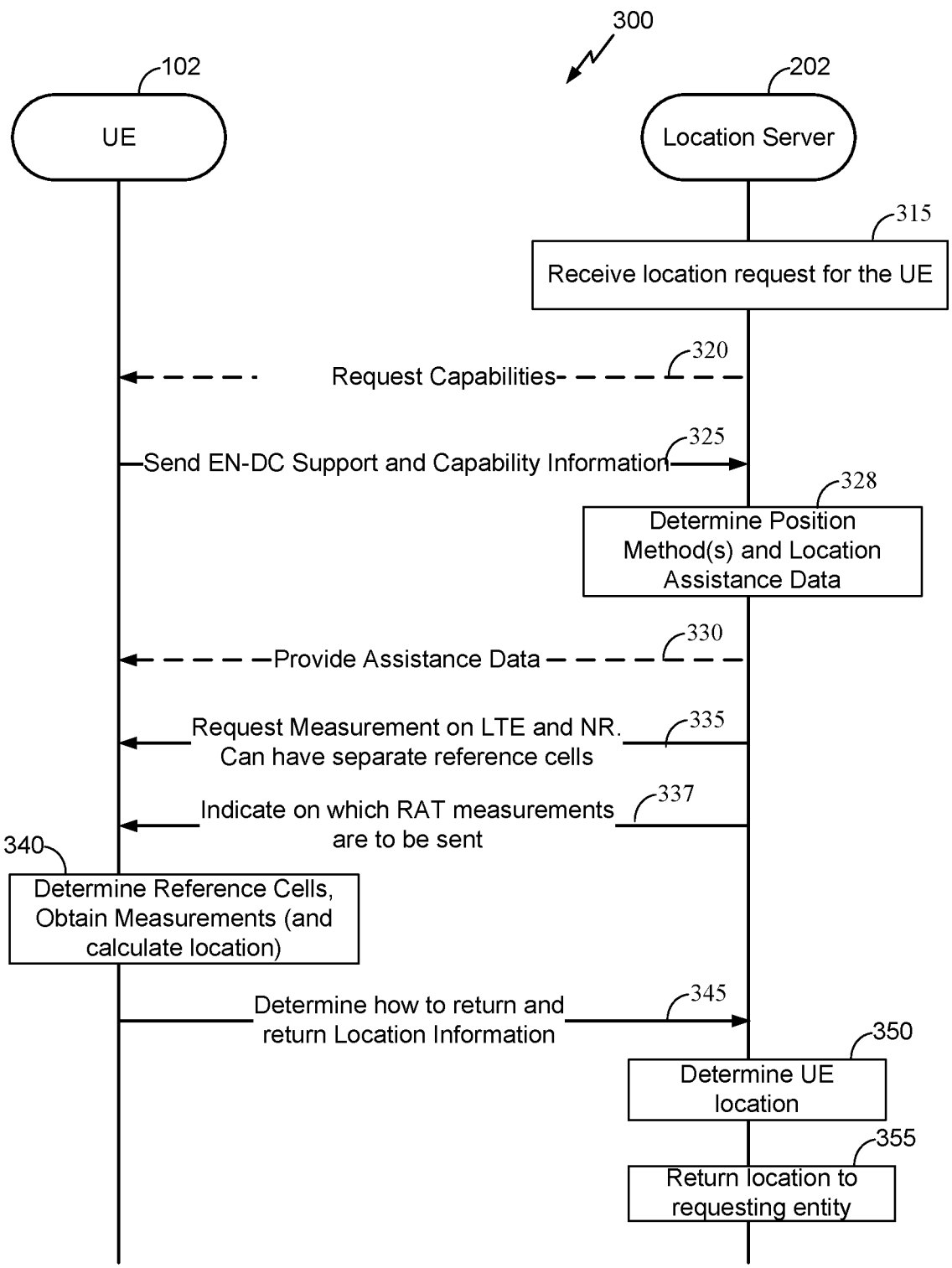

FIG. 3 shows a signaling flow 300 that is similar to signaling flow 200, but contains additional details and is generally applicable to communication system 100 shown in FIG. 1A and/or communication system 101 shown in FIG. 1B.

At block 315 in FIG. 3, a location session may be initiated when the location server 202 receives a location request for the UE 102, e.g., from the External Client 150 via either (i) the GMLCs 116V and 116H and MME 108 (e.g. when LS 202 corresponds to E-SMLC 110), or (ii) the GMLCs 155V and 155H and AMF 154 (e.g. when LS 202 corresponds to LMF 152).

At action 320, the location server 202 may optionally request capability information from the UE 102 by sending a Request Capabilities message (e.g. an LPP message) to the UE 102.

At action 325, capability information is provided by UE 102, e.g., in a Provide Capabilities message (e.g. an LPP message) sent by the UE 102 to the location server 202. The capability information may be provided by the UE 102 in response to the Request Capabilities message or may be provided without a request, in which case action 320 may not occur. The UE 102 may send its DC (or EN-DC) support capabilities to the location server 202. The DC support capabilities may indicate that UE 102 currently has dual connectivity to both LTE and NR and/or may indicate that UE 102 can support DC or EN-DC. The location server 202 will thus be aware of the multiple connections to and from UE 102 possible on the different RATs and can provide assistance data via one RAT (e.g. LTE or NR) or both RATs (e.g. LTE and NR) simultaneously. The UE 102 may also send its EUTRAN-NR dual connectivity frequency band combination support to the location server 202 (e.g. may indicate to LS 202 which frequency bands UE 102 can support for LTE and for NR access when using DC).

At block 328, the location server 202 may determine one or more position methods to be used to locate the UE 102 and location assistance data (AD) to be provided to the UE 102 based at least in part on the capability information received from the UE 102 at action 325. For example, location server 202 may determine use of, and assistance data for, OTDOA for NR access when this can provide more accurate location than OTDOA for LTE, or may determine use of, and assistance data for, OTDOA for both LTE and NR access.

At action 330, the location server 202 may send the UE 102 a Provide Assistance Data (PAD) message (e.g. an LPP message), in response to receiving the Provide Capabilities message at action 325 and determining the position method(s) and location assistance data at block 328. The PAD message may include the AD determined in block 328, and may include assistance data for one or more different RATs (e.g. LTE, NR, etc.).

In one embodiment, action 330 may be preceded by UE 102 sending a Request Assistance Data message (e.g. an LPP message) to location server 202 to request assistance data (not shown in FIG. 3). In this embodiment, UE 102 may indicate all the assistance data which UE 102 needs.

At action 335, the location server 202 sends a Request Location Information (RLI) message (e.g. an LPP message) to the UE 102 requesting measurements for NR and/or LTE, according to the position method(s) determined at block 328. When OTDOA measurements are requested for both LTE and NR, there can be separate reference cells for each of NR and LTE or one common reference cell for both LTE and NR included in the PAD message sent at action 330. Here, the location server 202 may request location-related measurements (e.g. measurements for A-GNSS, OTDOA and/or RTK). In some embodiments, the Request Location Information message may request that UE 102 compute a location estimate from these measurements (e.g. if the position method is UE based OTDOA or UE based A-GNSS) and may also include a requested accuracy for any location measurements or location estimate and/or a maximum response time. In some embodiments, the Request Location Information message may be a request for location information for one or more position methods determined in block 328 based on the capabilities information provided at action 325.

At action 337, the location server 202 may indicate to the UE 102 whether measurements can be returned using a different RAT than used in actions 320, 325, 330, 335 and 337 (e.g., via LTE if NR is being used for signaling and vice versa) and provides suitable correlation information to enable use of the different RAT. If desired, action 337 may be combined with action 335.

At block 340, the UE 102 may determine reference cells for OTDOA measurements (if used) with the option to change or remove reference cells sent by the location server 202 (e.g. one reference cell may be needed at a minimum, but the UE 102 may use two separate reference cells for LTE and NR). The UE 102 may obtain the location information requested at action 335. The location information, for example, may be location related measurements obtained by UE 102 for RF signals transmitted by base stations, e.g., eNBs 104 and 106 and gNBs 111, and, if desired, SVs 160. For example, location related measurements may include measurements of RSTD obtained by measuring PRS or other reference signals (e.g. CRS signals) transmitted by base stations, measurements of RTT obtained by measuring signals transmitted from and/or to base stations, and/or measurements of pseudorange, code phase or carrier phase obtained by measuring one or more (e.g. GNSS) navigation signals transmitted by each of one or more SVs 160. In some embodiments, UE 102 may also calculate a location estimate based on the obtained location measurements. The UE 102 may use the received AD for one or more RATs at action 330 to help obtain the location measurements and/or determine any location estimate.

At action 345, the UE 102 determines how to return the measurements according to the message received at action 337 (if this occurs) and returns the information indicative of one or more location-related measurements (e.g. a location estimate or the location measurements) to the location server 202, e.g., in a Provide Location Information message (e.g. an LPP message), which may be returned using the same RAT as used in previous exchanges or using a different RAT.

At block 350, the location server 202 can use the location information received at action 345 (comprising one or more location-related measurements or a location estimate) to determine (e.g. calculate or verify) an estimated location of the UE 102. The determined location estimate (and any accompanying uncertainty or expected error, if determined) may then be returned to the requesting entity at block 355.

Figure 4:
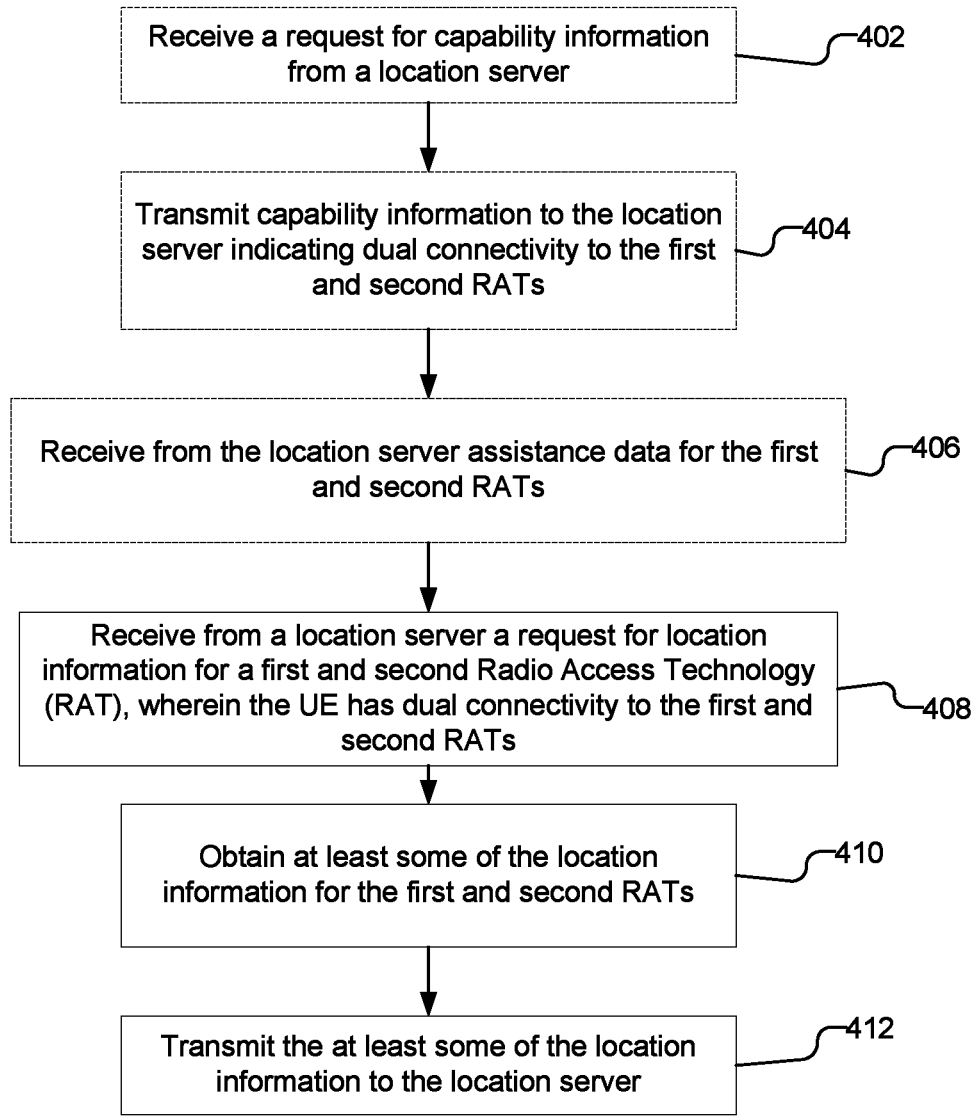
FIG. 4 is a flow diagram of a procedure that may be performed at a UE with dual connectivity for obtaining location information.

FIG. 4 shows a process flow illustrating a method of obtaining location information performed by a user equipment (UE), such as UE 102, as discussed above. As illustrated at block 408, the UE may receive from a location server (e.g. E-SMLC 110 or LMF 152) a request for location information for a first and second Radio Access Technology (RAT), where the UE has dual connectivity to the first and second RATs. At block 410, the UE obtains at least some of the location information for the first and second RATs. At block 412, the UE transmits the at least some of the location information to the location server.

In one implementation, as illustrated at optional block 404 (indicated by dotted lines), the method may further include transmitting capability information to the location server indicating dual connectivity to the first and second RATs, where the request for location information may be received in response to the capability information. In one implementation, as illustrated at optional block 402, the UE may receive a request for capability information from the location server, where the capability information is transmitted in block 404, in response to receiving the request for capability information.

In one implementation, the at least some of the location information includes location measurements obtained for the first and second RATs, a location estimate determined using location measurements obtained for the first and second RATs, or both location measurements and a location estimate. By way of example, the location measurements may comprise measurements (e.g. RSTD measurements) for UE assisted Observed Time Difference of Arrival (OTDOA) or the location estimate may comprise a location estimate for UE based OTDOA, where the UE may use the same reference cell for all measurements (e.g. all RSTD measurements) for the first and second RATs.

In one implementation, the request for location information in block 408 is received from the location server using the first RAT, where the at least some of the location information is transmitted to the location server in block 412 using the second RAT. For example, the request for location information for the first and second RATs may include an indication that the location information may be transmitted by the UE to the location server using the second RAT and correlation information, where the correlation information is included by the UE with the at least some location information transmitted to the location server using the second RAT.

In one implementation, as illustrated at optional block 406, the UE may receive from the location server assistance data for the first and second RATs (e.g. assistance data for OTDOA).

In one implementation, the request for location information may include a first request for location information for the first RAT and a second request for location information for the second RAT, where the second request is received by the UE after the first request. For example, the UE may obtain at least some of the location information for the first RAT and transmit the at least some of the location information for the first RAT to the location server, and may obtain at least some of the location information for the second RAT, and transmit the at least some of the location information for the second RAT to the location server. The second request for location information for the second RAT, for example, may be received in response to transmitting the at least some of the location information for the first RAT to the location server, where the at least some of the location information for the second RAT is more accurate than the at least some of the location information for the first RAT.

In one implementation, the first RAT may be either Long Term Evolution (LTE) or IEEE 802.11 WiFi and the second RAT may be New Radio (NR) or the first and second RATs may be the reverse of this.

Figure 5:
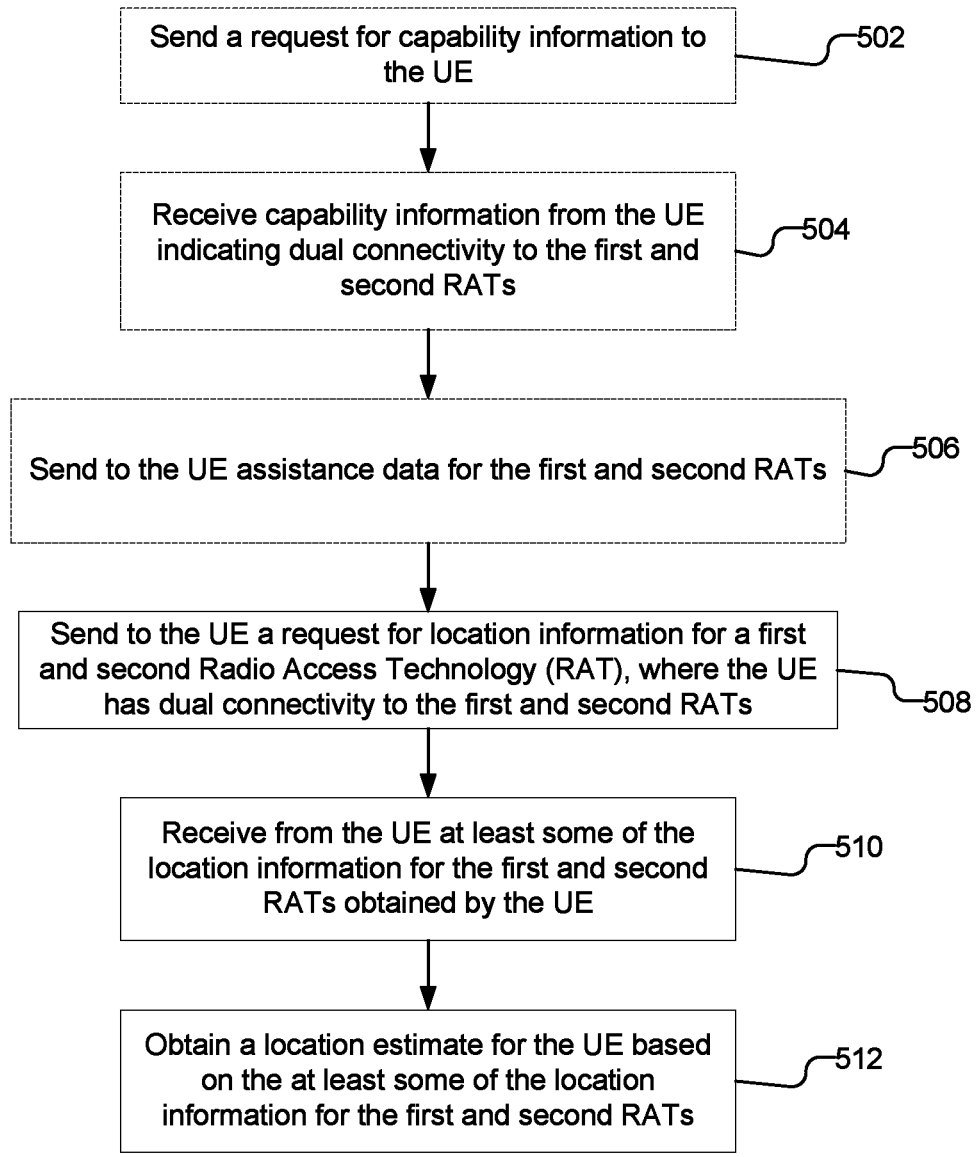
FIG. 5 is a flow diagram of a procedure that may be performed at a location server for obtaining location information for a UE with dual connectivity.

FIG. 5 shows a process flow illustrating a method of obtaining location information for a UE (e.g. UE 102) performed by a location server, such as E-SMLC 110, LMF 152 or a combination of E-SMLC 110 and LMF 152, as discussed above. As illustrated at block 508, the location server sends to the UE a request for location information for a first and second Radio Access Technology (RAT), where the UE has dual connectivity to the first and second RATs. As illustrated at block 510, the location server receives from the UE at least some of the location information for the first and second RATs obtained by the UE. As illustrated at block 512, the location server obtains a location estimate for the UE based on the at least some of the location information for the first and second RATs.

In one implementation, as illustrated at optional block 504 (indicated by dotted lines), the method may further include receiving capability information from the UE indicating dual connectivity to the first and second RATs, where the request for location information is sent to the UE in response to the capability information. In one implementation, as illustrated at optional block 502, the location server may send a request for capability information to the UE, where the capability information received in block 504 is sent by the UE in response to receiving the request for capability information.

In one implementation, the location information may include location measurements obtained by the UE for the first and second RATs, a location estimate determined by the UE using the location measurements obtained by the UE for the first and second RATs, or both location measurements and a location estimate. By way of example, the location measurements may comprise measurements (e.g. RSTD measurements) for UE assisted Observed Time Difference of Arrival (OTDOA), or the location estimate may comprise a location estimate for UE based OTDOA, where the UE may use the same reference cell for all measurements (e.g. all RSTD measurements) for the first and second RATs.

In one implementation, the request for location information is sent to the UE using the first RAT, where the at least some of the location information is received from the UE using the second RAT. For example, the request for location information for the first and second RATs may include an indication that the location information may be transmitted by the UE to the location server using the second RAT and correlation information, and where the correlation information is included by the UE with the at least some of the location information received from the UE using the second RAT.

In one implementation, as illustrated at block 506, the location server may send to the UE assistance data for the first and second RATs (e.g. assistance data for OTDOA).

In one implementation, the request for location information may include a first request for location information for the first RAT and a second request for location information for the second RAT, where the second request is sent after the first request. For example, the location server may receive from the UE the at least some of the location information for the first RAT obtained by the UE, and may receive from the UE the at least some of the location information for the second RAT obtained by the UE. The second request for location information for the second RAT, for example, may be sent by the location server in response to receiving from the UE the at least some of the location information for the first RAT obtained by the UE, where the at least some of the location information for the second RAT is more accurate than the at least some of the location information for the first RAT.

In one implementation, the first RAT comprises either Long Term Evolution (LTE) or IEEE 802.11 WiFi and the second RAT comprises New Radio (NR) or the first and second RATs may be the reverse of this.

Figure 6:
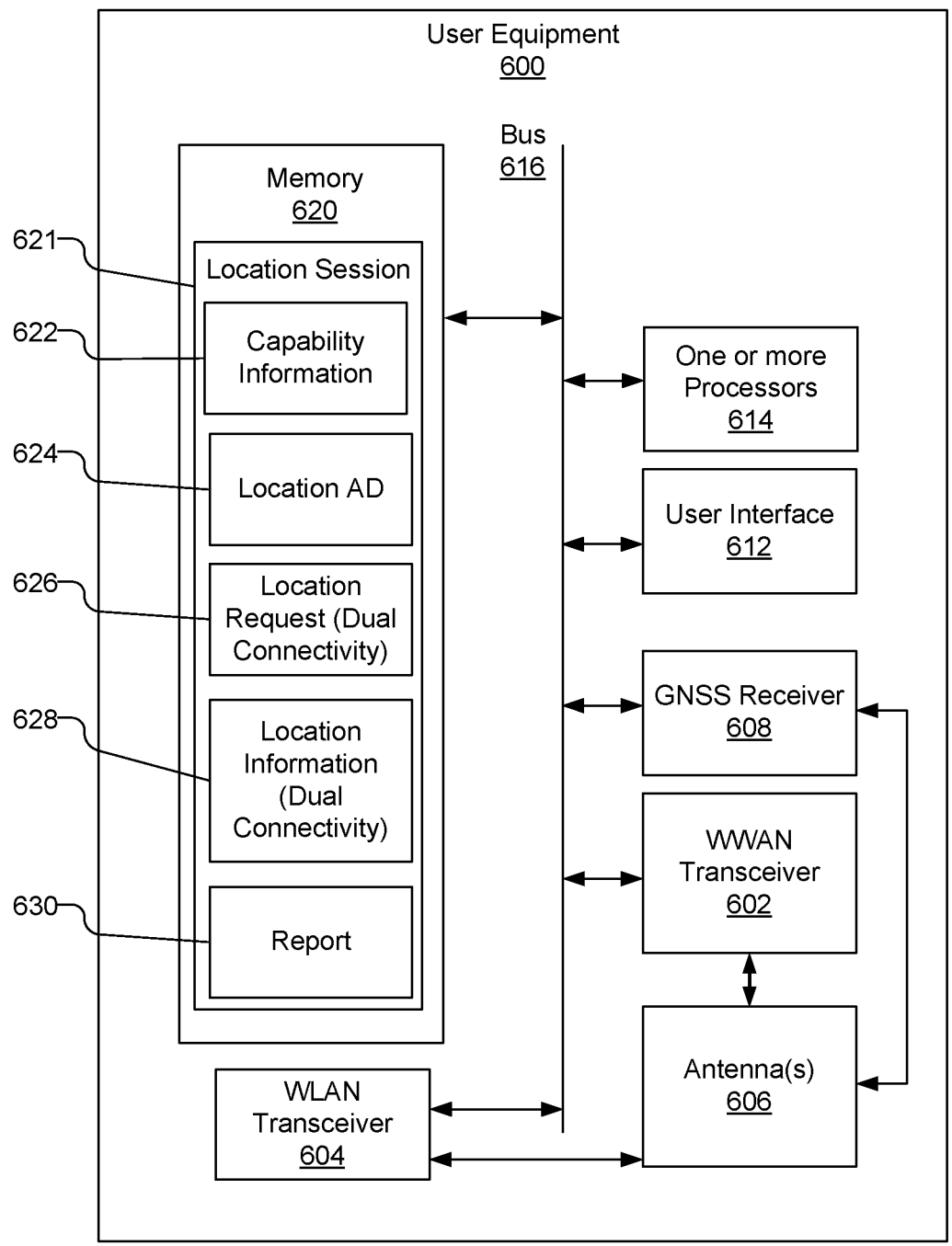
FIG. 6 shows an exemplary architecture of a UE with dual connectivity.

FIG. 6 is a diagram illustrating an example of a hardware implementation of an UE 600, such as UE 102 illustrated in FIGS. 1A-3, capable of obtaining location information using dual connectivity, as described above. The UE 600 may include a WWAN transceiver 602 to wirelessly communicate with, e.g., cellular transceivers such as one or more of an evolved Node B (e.g. eNB 104), a next generation eNB (e.g. ng-eNB 113), and/or a New Radio (NR) Node B (e.g. gNB 111-1). The UE 600 may also include a WLAN transceiver 604 to wirelessly communicate with local transceivers (e.g. IEEE 802.11 WiFi APs or Bluetooth beacons). The UE 600 may include one or more antennas 606 that may be used with the WWAN transceiver 602 and WLAN transceiver 604. The UE 600 may further include a GNSS receiver 608 for receiving and measuring signals from GNSS SVs 160 (shown in FIGS. 1A and 1B). The UE 600 may further include a user interface 612 that may include e.g., a display, a keypad or other input device, such as virtual keypad on the display, through which a user may interface with the UE 600.

The UE 600 further includes one or more processors 614 and memory 620, which may be coupled together with bus 616. The one or more processors 614 and other components of the UE 600 may similarly be coupled together with bus 616, a separate bus, or may be directly connected together or coupled using a combination of the foregoing. The memory 620 may store data and may contain executable code, firmware or software instructions that when executed by the one or more processors 614 cause the one or more processors 614 to operate as a special purpose computer programmed to perform the techniques disclosed herein. As illustrated for UE 600, the memory 620 may include one or more components or modules that may be implemented by the one or more processors 614 to perform the methodologies described herein. While the components or modules are illustrated as software in memory 620 that is executable by the one or more processors 614, it should be understood that the components or modules may be dedicated hardware either in the one or more processors 614 or off the processors.

A number of software modules and data tables may reside in the memory 620 and be utilized by the one or more processors 614 in order to manage both communications and the functionality described herein. It should be appreciated that the organization of the contents of the memory 620 as shown in mobile device is merely exemplary, and as such the functionality of the modules and/or data structures may be combined, separated, and/or be structured in different ways depending upon the implementation of the UE 600.

The memory 620 may include a location session module 621 that when implemented by the one or more processors 614 configures the one or more processors 614 to engage in a location session with a location server as discussed herein, e.g., at actions and blocks 320-355 in signaling flow 300. For example, the memory 620 may include a capability information module 622 that stores the capabilities and DC or EN-DC status of the UE 600, including an indication of EN-DC support and capabilities of the UE 600, and when implemented by the one or more processors 614 configures the one or more processors 614 to transmit, via the WWAN transceiver 602 or WLAN transceiver 604, the capability information to a location server (e.g. an E-SMLC 110 or LMF 152), which may be transmitted, e.g., in response to receiving a request for capability information from the location server. The location session module 621 in the memory 620 may further include a location assistance data (AD) module 624 that when implemented by the one or more processors 614 configures the one or more processors 614 to receive the location assistance data for different RATs via the WWAN transceiver 602 or WLAN transceiver 604.

The location session module 621 in the memory 620 may further include a location request module 626 that when implemented by the one or more processors 614 configures the one or more processors 614 to receive a request for location information for different RATs via the WWAN transceiver 602 or WLAN transceiver 604. The location session module 621 in the memory 620 may further include a location information module 628 that when implemented by the one or more processors 614 configures the one or more processors 614 to obtain, e.g., via one or more of the WWAN transceiver 602, the WLAN transceiver 604, and the GNSS receiver 608, at least some of location information from different RATs based at least in part on the location assistance data, if received. The location information may be location measurements, such as measurements of RSTD obtained by measuring PRS or other reference signals (e.g. CRS signals), measurements of RTT obtained by measuring signals, and/or measurements of pseudorange, code phase or carrier phase obtained by measuring one or more GNSS navigation signals. The location information may additionally or alternatively be a location estimate determined by the UE 600. The location session module 621 may further include a report module 630 that transmits, e.g., via the WWAN transceiver 602 or WLAN transceiver 604, at least some of the location information to the location server.

The methodologies described herein may be implemented by various means depending upon the application. For example, these methodologies may be implemented in hardware, firmware, software, or any combination thereof. For a hardware implementation, the one or more processors 614 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 600 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 620) and executed by one or more processors 614, causing the one or more processors 614 to operate as a special purpose computer programmed to perform the techniques disclosed herein. Memory may be implemented within the one or processors 614 or external to the one or more processors 614. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 600 may be stored as one or more instructions or code on a non-transitory computer-readable storage medium such as memory 620. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 600 may be provided as signals on transmission media included in a communication apparatus. For example, a communication apparatus comprising part or all of UE 600 may include a transceiver having signals indicative of instructions and data. The instructions and data are stored on non-transitory computer readable media, e.g., memory 620, and are configured to cause the one or more processors 614 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 7:
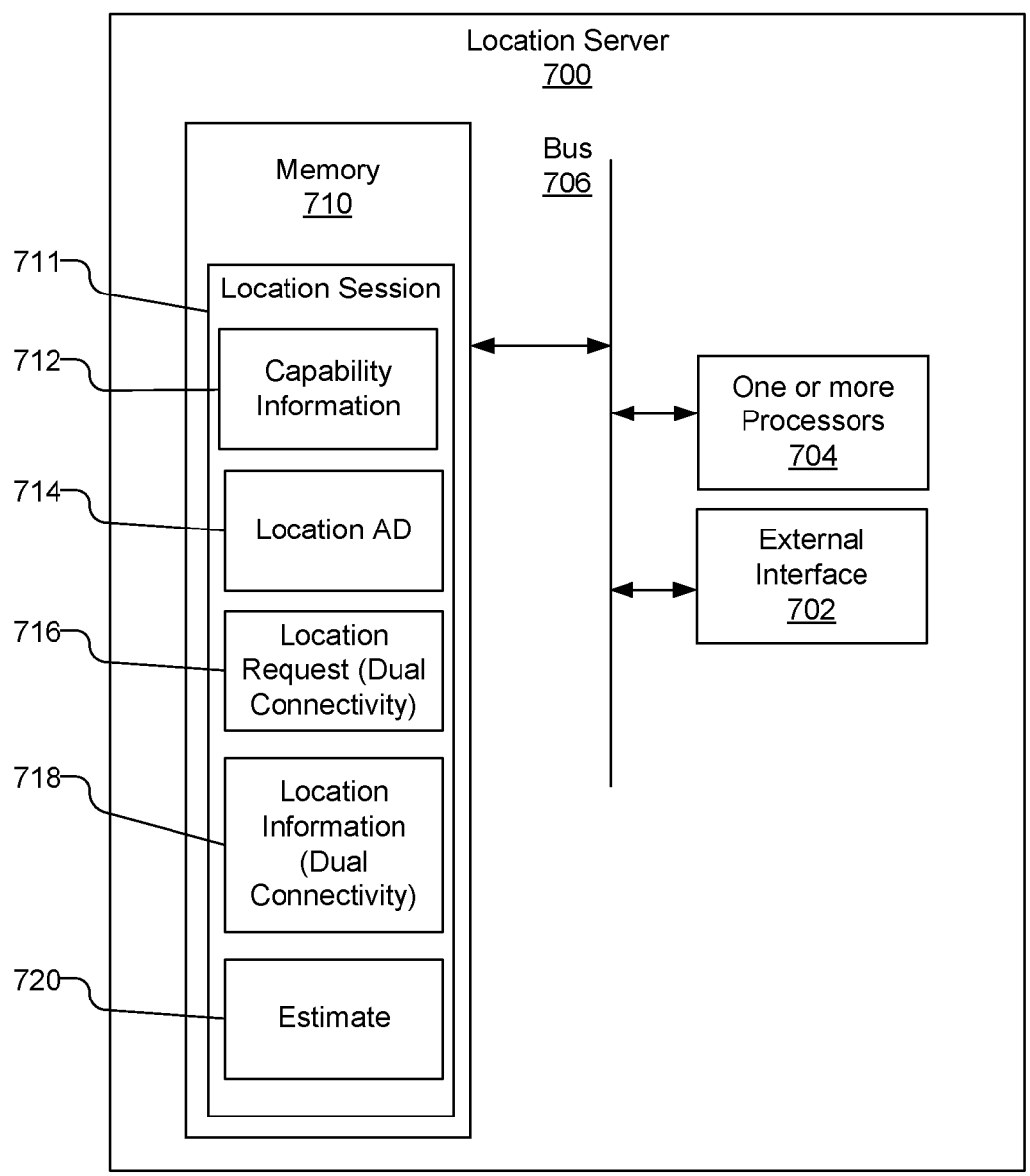
FIG. 7 shows an exemplary architecture of a location server.

FIG. 7 is a diagram illustrating an example of a hardware implementation of a location server 700. The location server 700 may be a location server, such as the E-SMLC 110 or H-SLP 118 in FIG. 1A, the H-SLP 184 in FIG. 1B, or a Location Management Function (LMF) such as LMF 152 illustrated in FIG. 1B. The location server 700 includes, e.g., hardware components such as an external interface 702, which may be a wired or wireless interface capable of connecting to UE 102 and an external client 150 directly or through one or more intermediary networks and/or one or more network entities. The location server 700 includes one or more processors 704 and memory 710, which may be coupled together with bus 706. The memory 710 may contain executable code or software instructions that when executed by the one or more processors 704 cause the one or more processors to operate as a special purpose computer programmed to perform the techniques disclosed herein. As illustrated in FIG. 7, the memory 710 may include one or more components or modules that may be implanted by the one or more processors 704 to perform the methodologies as described herein. While the components or modules are illustrated as software in memory 710 that is executable by the one or more processors 704, it should be understood that the components or modules may be firmware or dedicated hardware either in the one or more processors 704 or off the processors.

A number of software modules and data tables may reside in the memory 710 and may be utilized by the one or more processors 704 in order to manage both communications and the functionality described herein. It should be appreciated that the organization of the contents of the memory 710 as shown in FIG. 7 is merely exemplary, and as such the functionality of the modules and/or data structures may be combined, separated, and/or be structured in different ways depending upon the implementation of the location server 700.

The memory 710 may further include a location session module 711 that when implemented by the one or more processors 704 configures the one or more processors 704 to engage in a location session with a UE (e.g. UE 102) as discussed herein, e.g., at actions and blocks 320-355 in signaling flow 300. For example, the memory 710 may include a capability information module 712 that when implemented by the one or more processors 704 configures the one or more processors 704 to receive, via the external interface 702, capability information from a UE, including an indication of DS or EN-DC support and capabilities of the UE 600. The capability information module 712 may further configure the one or more processors 704 to cause the external interface to send a request to the UE for the capability information. The location session module 711 in the memory 710 may further include a location assistance data (AD) module 714 that when implemented by the one or more processors 704 configures the one or more processors 704 to determine a set of location assistance data for different RATs. The location assistance data module 714 may further configure the one or more processors 704 to determine a second set of assistance data for a second RAT based on location information for a first RAT received from the UE via the external interface 702.

The location session module 711 may further include a location request module 716 that when implemented by the one or more processors 704 configures the one or more processors 704 to send a request for location information for different RATs via the external interface 702. The location session module 711 may further include a location information module 718 that when implemented by the one or more processors 704 configures the one or more processors 704 to cause the external interface 702 to receive, via the external interface 702, location information from the UE. The location information may be location measurements, such as measurements of RSTD obtained by the UE by measuring PRS or other reference signals (e.g. CRS signals), measurements of RTT obtained by measuring signals, and/or measurements of pseudorange, code phase or carrier phase obtained by measuring one or more GNSS navigation signals. The location information may additionally or alternatively be a location estimate determined by the UE. The location session module 711 may further include an estimate module 720 that when implemented by the one or more processors 704 configures the one or more processors 704 to compute or verify a location of the UE using the location information.

The methodologies described herein may be implemented by various means depending upon the application. For example, these methodologies may be implemented in hardware, firmware, software, or any combination thereof. For a hardware implementation, the one or more processors 704 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of location server 700 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 710) and executed by one or more processors 704, causing the one or more processors 704 to operate as a special purpose computer programmed to perform the techniques disclosed herein. Memory may be implemented within the one or processors 704 or external to the one or more processors 704. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by location server 700 may be stored as one or more instructions or code on a non-transitory computer-readable storage medium such as memory 710. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for location server 700 may be provided as signals on transmission media included in a communication apparatus. For example, a communication apparatus comprising part or all of location server 700 may include a transceiver having signals indicative of instructions and data. The instructions and data are stored on non-transitory computer readable media, e.g., memory 710, and are configured to cause the one or more processors 704 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

As used herein, the terms "mobile device" and "user equipment" (UE) are used synonymously to refer to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband CDMA (WCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) and 5G or New Radio (NR) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method of obtaining location information performed by a user equipment (UE) comprising:
   receiving, from a location server, assistance data comprising positioning reference signal (PRS) configuration information;
   receiving from the location server a request for location information for a first Radio Access Technology (RAT) and second RAT, wherein the UE has dual connectivity to the first and second RATs, wherein the request for location information instructing the UE to obtain the location information comprising one or more measurements of signals transmitted according to the first and second RATs, wherein the request for location information for the first and second RATs includes an indication that the location information may be transmitted by the UE to the location server using the second RAT and correlation information, wherein the correlation information comprises an identification of at least one of the UE, a location session between the UE and the location server, or a combination thereof;

obtaining at least some of the location information for the first and second RATs; and transmitting the at least some of the location information to the location server;

wherein the request for location information is received from the location server using the first RAT, and wherein the at least some of the location information with the correlation information is transmitted to the location server using the second RAT.

2. The method of claim 1, further comprising:

transmitting capability information to the location server indicating the dual connectivity to the first and second RATs, wherein the request for location information is received in response to the capability information.

3. The method of claim 1, wherein the at least some of the location information comprises location measurements obtained for the first and second RATs, a location estimate determined using location measurements obtained for the first and second RATs, or both the location measurements and the location estimate.

4. The method of claim 3, wherein the location measurements comprise measurements for UE assisted Observed Time Difference of Arrival (OTDOA) or the location estimate comprises a location estimate for UE based OTDOA, wherein the UE uses the same reference cell for all measurements for the first and second RATs.

5. The method of claim 1, wherein the first RAT is used for signaling while the at least some of the location information is transmitted to the location server using the second RAT.

6. The method of claim 1, wherein the correlation information enables the request for location information to be received from the location server using the first RAT and the at least some of the location information to be transmitted to the location server using the second RAT.

7. The method of claim 1, further comprising receiving from the location server assistance data for the first and second RATs.

8. The method of claim 1, wherein the request for location information comprises a first request for location information for the first RAT and a second request for location information for the second RAT, wherein the second request is received after the first request, and further comprising:

obtaining at least some of the location information for the first RAT;

transmitting the at least some of the location information for the first RAT to the location server;

obtaining at least some of the location information for the second RAT; and transmitting the at least some of the location information for the second RAT to the location server, wherein the second request for location information for the second RAT is received in response to transmitting the at least some of the location information for the first RAT to the location server, wherein the at least some of the location information for the second RAT is more accurate than the at least some of the location information for the first RAT.

9. The method of claim 1, wherein the first RAT comprises Long Term Evolution (LTE) or IEEE 802.11 WiFi and the second RAT comprises New Radio (NR).

10. A user equipment (UE) capable of obtaining location information, the UE comprising:

at least one wireless transceiver configured to wirelessly communicate with at least one wireless network;

at least one memory; and at least one processor coupled to the at least one wireless transceiver and the at least one memory and configured to:

receive, from a location server, assistance data comprising positioning reference signal (PRS) configuration information;

receive from the location server a request for location information for a first Radio Access Technology (RAT) and second RAT, wherein the UE has dual connectivity to the first and second RATs, wherein the request for location information instructing the UE to obtain the location information comprising one or more measurements of signals transmitted according to the first and second RATs, wherein the request for location information for the first and second RATs includes an indication that the location information may be transmitted by the UE to the location server using the second RAT and correlation information, wherein the correlation information comprises an identification of at least one of the UE, a location session between the UE and the location server, or a combination thereof;

obtain at least some of the location information for the first and second RATs; and transmit the at least some of the location information to the location server, wherein the request for location information is received from the location server using the first RAT, and wherein the at least some of the location information with the correlation information is transmitted to the location server using the second RAT.

11. The UE of claim 10, wherein the at least one processor is further configured to:

transmit capability information to the location server indicating the dual connectivity to the first and second RATs, wherein the request for location information is received in response to the capability information.

12. The UE of claim 10, wherein the at least some of the location information comprises location measurements obtained for the first and second RATs, a location estimate determined using location measurements obtained for the first and second RATs, or both the location measurements and the location estimate.

13. The UE of claim 12, wherein the location measurements comprise measurements for UE assisted Observed Time Difference of Arrival (OTDOA) or the location estimate comprises a location estimate for UE based OTDOA, wherein the UE uses the same reference cell for all measurements for the first and second RATs.

14. The UE of claim 10, wherein the first RAT is used for signaling while the at least some of the location information is transmitted to the location server using the second RAT.

15. The UE of claim 10, wherein the correlation information enables the request for location information to be received from the location server using the first RAT and the at least some location information to be transmitted to the location server using the second RAT.

16. The UE of claim 10, wherein the at least one processor is further configured to receive from the location server assistance data for the first and second RATs.

17. The UE of claim 10, wherein the request for location information comprises a first request for location information for the first RAT and a second request for location information for the second RAT, wherein the second request is received after the first request, and wherein the at least one processor is further configured to:
  obtain at least some of the location information for the first RAT;
  transmit the at least some of the location information for the first RAT to the location server;
  obtain at least some of the location information for the second RAT; and
  transmit the at least some of the location information for the second RAT to the location server, wherein the second request for location information for the second RAT is received in response to transmitting the at least some of the location information for the first RAT to the location server, wherein the at least some of the location information for the second RAT is more accurate than the at least some of the location information for the first RAT.

18. The UE of claim 10, wherein the first RAT comprises Long Term Evolution (LTE) or IEEE 802.11 WiFi and the second RAT comprises New Radio (NR).

19. A method of obtaining location information for a user equipment (UE) performed by a location server comprising:
  sending, to the UE, assistance data comprising positioning reference signal (PRS) configuration information;
  sending to the UE a request for location information for a first Radio Access Technology (RAT) and second RAT, wherein the UE has dual connectivity to the first and second RATs, wherein the request for location information instructing the UE to obtain the location information comprising one or more measurements of signals transmitted according to the first and second RATs, wherein the request for location information for the first and second RATs includes an indication that the location information may be transmitted by the UE to the location server using the second RAT and correlation information, wherein the correlation information comprises an identification of at least one of the UE, a location session between the UE and the location server, or a combination thereof;
  receiving from the UE at least some of the location information for the first and second RATs obtained by the UE; and
  obtaining a location estimate for the UE based on the at least some of the location information for the first and second RATs,
  wherein the request for location information is sent to the UE using the first RAT, and wherein the at least some of the location information with the correlation information is received from the UE using the second RAT.

20. The method of claim 19, further comprising:
  receiving capability information from the UE indicating the dual connectivity to the first and second RATs, wherein the request for location information is sent to the UE in response to the capability information.

21. The method of claim 19, wherein the location information comprises location measurements obtained by the UE for the first and second RATs, a location estimate determined by the UE using the location measurements obtained by the UE for the first and second RATs, or both the location measurements and the location estimate.

22. The method of claim 21, wherein the location measurements comprise measurements for UE assisted Observed Time Difference of Arrival (OTDOA) or the location estimate comprises a location estimate for UE based OTDOA, wherein the UE uses the same reference cell for all measurements for the first and second RATs.

23. The method of claim 19, wherein the first RAT is used for signaling while the at least some of the location information is received from the UE using the second RAT.

24. The method of claim 19, wherein the correlation information enables the request for location information to be sent to the UE using the first RAT and the at least some of the location information to be received from the UE using the second RAT.

25. The method of claim 19, further comprising sending to the UE assistance data for the first and second RATs.

26. The method of claim 19, wherein the request for location information comprises a first request for location information for the first RAT and a second request for location information for the second RAT, wherein the second request is sent after the first request, and further comprising:
  receiving from the UE the at least some of the location information for the first RAT obtained by the UE;
  receiving from the UE the at least some of the location information for the second RAT obtained by the UE, wherein the second request for location information for the second RAT is sent in response to receiving from the UE the at least some of the location information for the first RAT obtained by the UE, wherein the at least some of the location information for the second RAT is more accurate than the at least some of the location information for the first RAT.

27. The method of claim 19, wherein the first RAT comprises Long Term Evolution (LTE) or IEEE 802.11 WiFi and the second RAT comprises New Radio (NR).

28. A location server for obtaining a location of a user equipment (UE), the location server comprising:
  an external interface configured to communicate with a wireless network;
  at least one memory; and
  at least one processor coupled to the external interface and the at least one memory and configured to:
  send, to the UE, assistance data comprising positioning reference signal (PRS) configuration information;
  send to the UE a request for location information for a first Radio Access Technology (RAT) and second RAT, wherein the UE has dual connectivity to the first and second RATs, wherein the request for location information instructing the UE to obtain the location information comprising one or more measurements of signals transmitted according to the first and second RATs, wherein the request for location information for the first and second RATs includes an indication that the location information may be transmitted by the UE to the location server using the second RAT and correlation information, wherein the correlation information comprises an identification of at least one of the UE, a location session between the UE and the location server, or a combination thereof;
  receive from the UE at least some of the location information for the first and second RATs obtained by the UE; and
  obtain a location estimate for the UE based on the at least some of the location information for the first and second RATs,
  wherein the request for location information is sent to the UE using the first RAT, and wherein the at least some of the location information with the correlation information is received from the UE using the second RAT.

29. The location server of claim 28, wherein the at least one processor is further configured to:
  receive capability information from the UE indicating the dual connectivity to the first and second RATs, wherein the request for location information is sent to the UE in response to the capability information.

30. The location server of claim 28, wherein the location information comprises location measurements obtained by the UE for the first and second RATs, a location estimate determined by the UE using the location measurements obtained by the UE for the first and second RATs, or both the location measurements and the location estimate.

31. The location server of claim 30, wherein the location measurements comprise measurements for UE assisted Observed Time Difference of Arrival (OTDOA) or the location estimate comprises a location estimate for UE based OTDOA, wherein the UE uses the same reference cell for all measurements for the first and second RATs.

32. The location server of claim 28, wherein the first RAT is used for signaling while the at least some of the location information is received from the UE using the second RAT.

33. The location server of claim 28, wherein the correlation information enables the request for location information to be sent to the UE using the first RAT and the at least some of the location information to be received from the UE using the second RAT.

34. The location server of claim 28, further comprising sending to the UE assistance data for the first and second RATs.

35. The location server of claim 28, wherein the request for location information comprises a first request for location information for the first RAT and a second request for location information for the second RAT, wherein the second request is sent after the first request, and wherein the at least one processor is further configured to:
receive from the UE the at least some of the location information for the first RAT obtained by the UE;
receive from the UE the at least some of the location information for the second RAT obtained by the UE, wherein the second request for location information for the second RAT is sent in response to receiving from the UE the at least some of the location information for the first RAT obtained by the UE, wherein the at least some of the location information for the second RAT is more accurate than the at least some of the location information for the first RAT.

36. The location server of claim 28, wherein the first RAT comprises Long Term Evolution (LTE) or IEEE 802.11 WiFi and the second RAT comprises New Radio (NR).

* * * * *